United States Patent
Juarez Corona

(10) Patent No.: US 9,873,381 B2
(45) Date of Patent: Jan. 23, 2018

(54) INTEGRATED HOLDER SYSTEM

(71) Applicant: FORD GLOBAL TECHNOLOGIES, LLC, Dearborn, MI (US)

(72) Inventor: Alejandro Juarez Corona, Tepotzotlan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 14/941,178

(22) Filed: Nov. 13, 2015

(65) Prior Publication Data
US 2017/0136954 A1    May 18, 2017

(51) Int. Cl.
*B60R 7/02* (2006.01)

(52) U.S. Cl.
CPC ..................... *B60R 7/02* (2013.01)

(58) Field of Classification Search
CPC .. B60R 7/02; B60R 7/043; B60R 7/08; B60R 2011/0003; B60R 2011/0015; B60R 2011/0036; B60R 2011/0045; B60R 2011/0047; B60R 2011/008; B60R 2011/0082; B60R 2011/0084; B60R 2011/0085
See application file for complete search history.

(56) References Cited

U.S. PATENT DOCUMENTS

| | | | |
|---|---|---|---|
| 5,287,971 A | | 2/1994 | Dorman |
| 5,484,091 A | | 1/1996 | Malinowski et al. |
| 5,492,257 A | | 2/1996 | Demick |
| 5,685,592 A | | 11/1997 | Heinz |
| 5,931,527 A | * | 8/1999 | D'Onofrio ............. B60N 3/004 297/146 |
| 6,041,945 A | | 3/2000 | Faraj |
| 6,092,704 A | | 7/2000 | Baumeister |
| 6,502,731 B1 | | 1/2003 | Gehring et al. |
| 8,858,139 B2 | | 10/2014 | Prottengeier et al. |

FOREIGN PATENT DOCUMENTS

WO    2004065197 A1    8/2004

* cited by examiner

*Primary Examiner* — Corey Skurdal
(74) *Attorney, Agent, or Firm* — Vichit Chea; King & Schickli, PLLC

(57) ABSTRACT

A holder assembly includes a vertically translatable article holder operatively associated with a substantially vertically-oriented washboard frame. The article holder includes at least one retainer for releasably engaging a plurality of vertically stacked steps of the frame. The at least one retainer further includes at least one tab for slidingly engaging at least one cooperating slot associated with the frame and at least one actuable latch for releasably engaging the plurality of vertically stacked steps. The article holder further includes a holder bar having a pivoting gate.

17 Claims, 5 Drawing Sheets

INTEGRATED HOLDER SYSTEM

TECHNICAL FIELD

This disclosure relates generally to accessory racks for motor vehicles, and more particularly to an integrated holder system for a vehicle.

BACKGROUND

A vehicle user often desires to carry various items in the vehicle, including handled items. It is certainly possible to simply set such items in the vehicle cargo area or on a seat or a floorboard of the vehicle. However, this risks the items sliding or overturning and potentially damaging the contents. Further, soiling of and possibly damage to the vehicle seat, floorboard, etc. from such spillage is possible. This is particularly true of very flexible handled items such as plastic or cloth grocery bags, tote bags, and the like. For that reason, often solutions to hold items such as boxes, bags, etc. are provided in vehicles. The solutions include fixed hooks, cargo netting, storage pockets or compartments, and various rack systems disposed in the vehicle interior and/or cargo area. Such solutions lack flexibility in the number and size of items which may be carried thereon, particularly in the case of handled items such as grocery bags, purses, tote bags, etc., but also for other items such as clothing carried on hangers. Moreover, handled items hung from a hook or rack tend to swing and sway because of the vehicle motion, also risking overturning and/or damage to the handled item contents and the vehicle interior.

To solve these and other problems, the present disclosure relates to a holder assembly for supporting items such as handled bags. Advantageously, the described assembly accommodates numerous items, and further is adjustable to accommodate numerous size dimensions of items to be carried in the vehicle.

SUMMARY

In accordance with the purposes and benefits described herein, in one aspect of the present disclosure a holder assembly is described, comprising a vertically translatable article holder operatively associated with a substantially vertically-oriented washboard frame. The article holder comprises at least one retainer for releasably engaging a plurality of vertically stacked steps of the frame. The at least one retainer further includes at least one tab for slidingly engaging at least one cooperating slot associated with the frame. The article holder further comprises a holder bar.

In embodiments, the at least one retainer comprises at least one actuable latch for releasably engaging the plurality of vertically stacked steps. In embodiments, the holder bar includes a pivoting gate translatable between an open configuration and a closed configuration. In embodiments the holder bar is configured to pivot between a stowed configuration and a deployed configuration. A recess associated with the frame may be provided for holding the holder bar in the stowed configuration.

In the following description, there are shown and described embodiments of the disclosed holder assembly. As it should be realized, the system is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed holder assembly, and together with the description serve to explain certain principles thereof. In the drawing.

Reference will now be made in detail to embodiments of the disclosed holder assembly, examples of which are illustrated in the accompanying drawing figures.

DETAILED DESCRIPTION

Preliminarily, the present disclosure primarily describes a holder assembly associated with a component of a vehicle such as a seatback, for example a rear-most seatback defining a wall of a vehicle cargo area. However, the skilled artisan will appreciate from the disclosure that the described system is readily adaptable to any surface of a vehicle defining an at least partially upwardly inclined plane. For example, association of the holder assembly with a side wall of a vehicle cargo area, a side or rear wall of a vehicle trunk, an interior surface of a vehicle liftgate, and others are all contemplated. Accordingly, the descriptions and drawings that follow will not be taken as limiting in regard to the above-described features.

Figure 1:
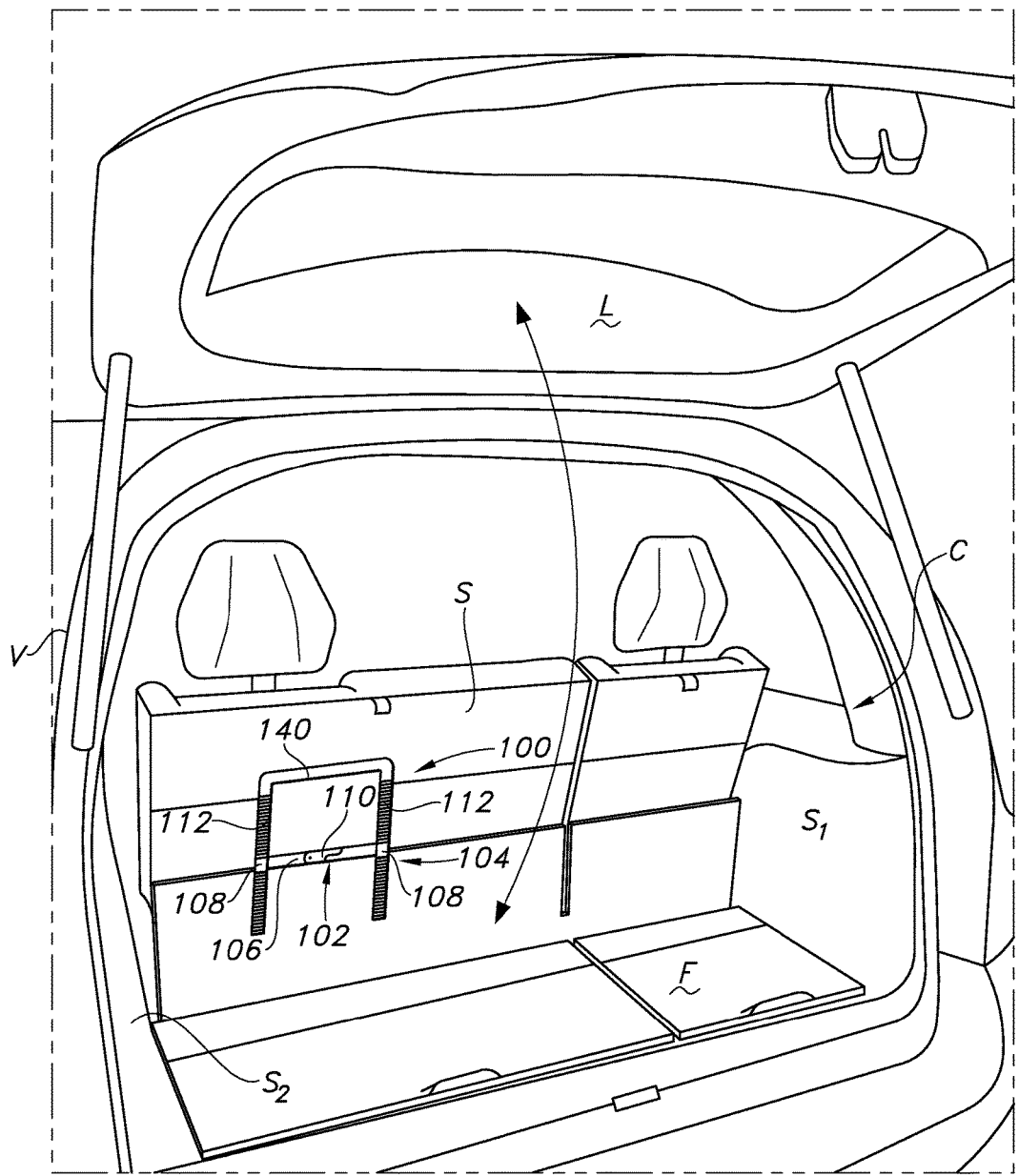
FIG. 1 depicts a holder assembly according to the present description, associated with a vehicle seatback.

With reference to FIG. 1, there is depicted a holder assembly 100 according to the present disclosure, associated with a seatback S of a vehicle V seat. As depicted, vehicle V includes a cargo area C defined as the area behind seatback S, further defined by a liftgate L, sidewalls $S_1$, $S_2$, and a load floor F.

Figure 2:
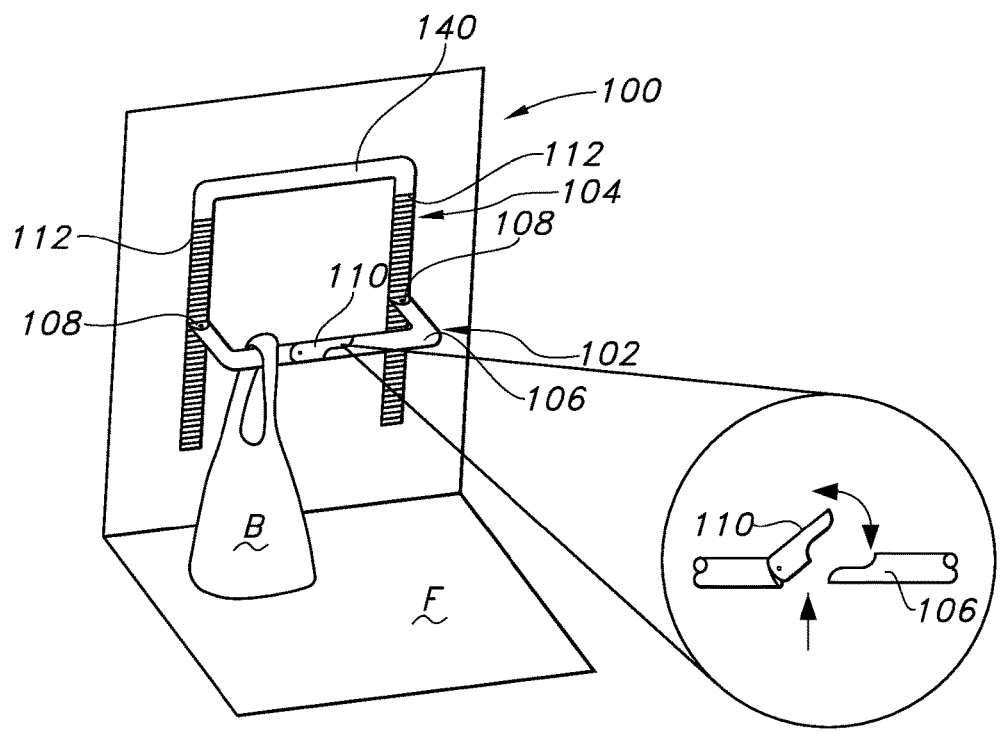
FIG. 2 depicts the holder assembly of FIG. 1 in a deployed configuration.

FIG. 2 depicts the holder assembly 100 in isolation, deployed to hold a handled bag B. The holder assembly includes a vertically translatable article holder 102 operatively associated with a substantially vertically-oriented washboard track system 104 comprising a plurality of vertically stacked steps as will be described below. As will be appreciated, by "substantially vertically-oriented" it is meant that the track system 104 is associated with the vehicle component such that it is held in a substantially upright orientation, although some deviation from a completely vertical orientation is contemplated in accordance with the plane defined with the vehicle surface with which the assembly 100 is associated/attached. For example, vehicle seatbacks S may often define or be reclined to define a surface deviating to some degree from a fully vertical plane.

The article holder 102 includes a holder bar 106 and a pair of terminal retainers 108 providing the recited vertically translatable function. The holder bar 106 may further include a gate 110 configured for pivoting between an open and a closed configuration (see insert arrow), to allow adding and removing bags B to the holder assembly 100. In embodiments, the gate 110 is spring-actuated, for example by a torsion spring (not shown) disposed to urge the gate towards the closed configuration. By this feature, inadvertent dislodgement of a bag B from the holder bar 106 is prevented.

Figure 3:
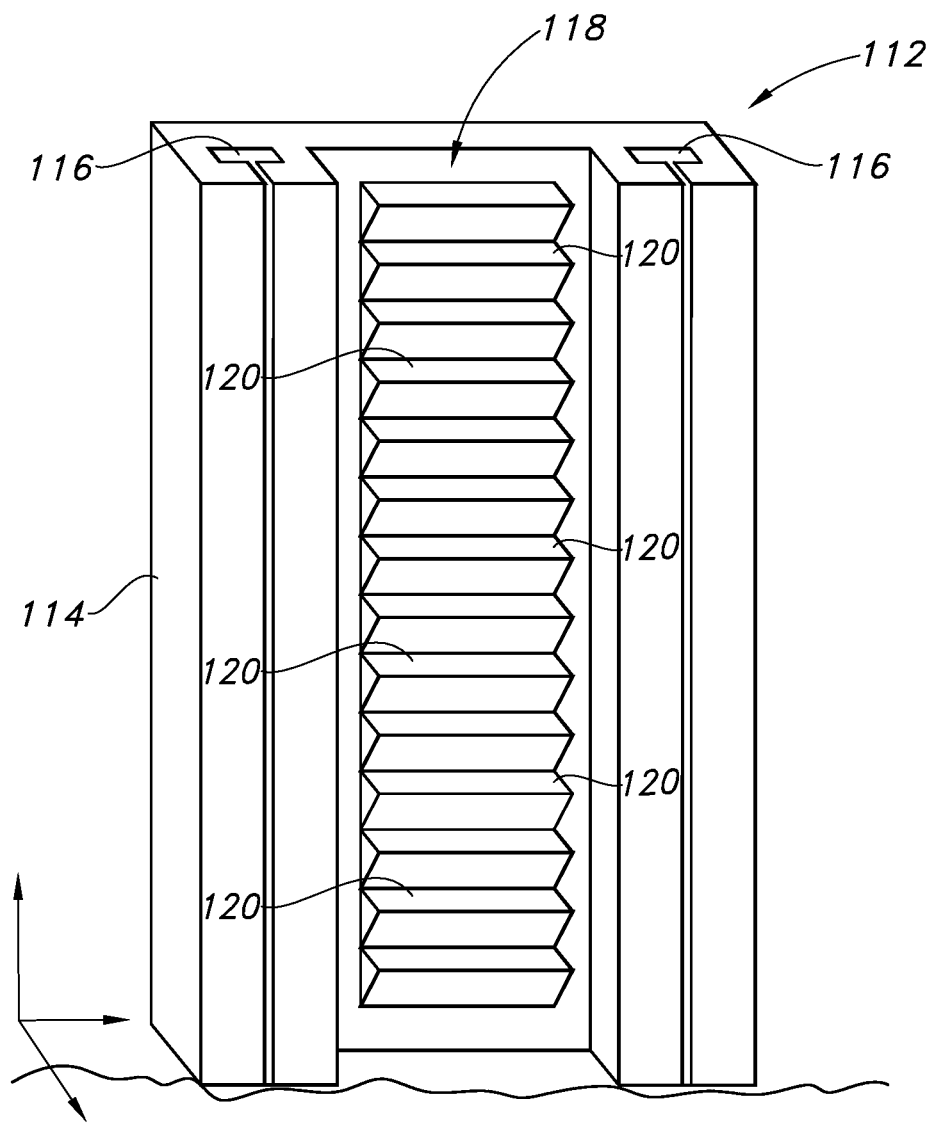
FIG. 3 depicts a track for an article holder according to the present description.

In an embodiment, the washboard track system 104 comprises a pair of vertically-oriented tracks 112. With reference to FIG. 3, each track 112 is defined by a body 114 including at least one slot 116 defined therein. In the depicted embodiment, a pair of opposed parallel slots 116 are defined in body 114, each defining a "T" shape in cross-section. The track body 114 further includes a washboard segment 118, comprising a plurality of vertically stacked steps 120.

Figure 4:
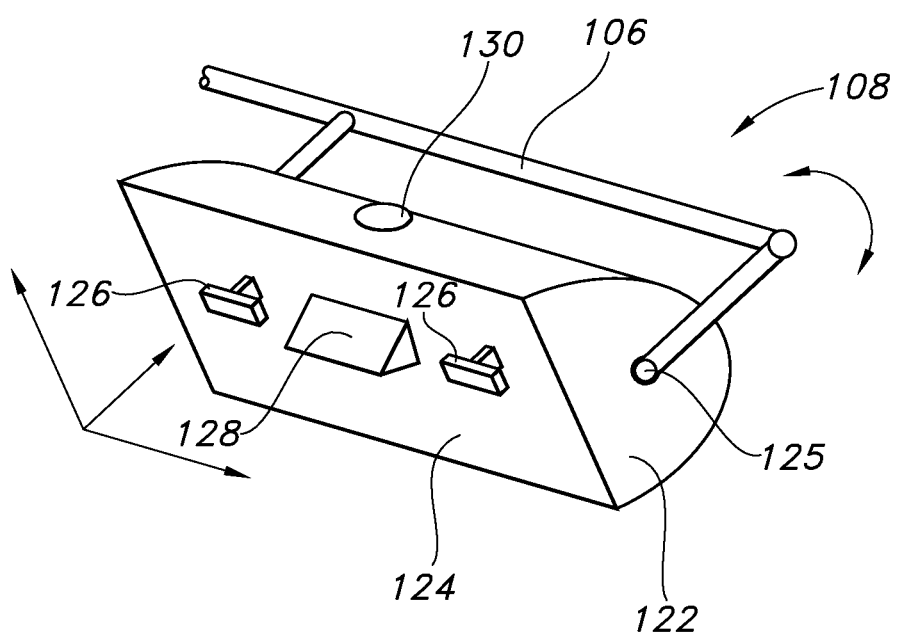
FIG. 4 depicts a retainer according to the present description.

An embodiment of a retainer 108 is shown in FIG. 4. As depicted, the retainer includes a retainer body 122 defining a planar surface 124. The planar surface 124 includes at least one tab 126, configured to be slidingly engaged by the slots 116 of tracks 112. Thus, in the depicted embodiment, a substantially T-shaped tab 126 is provided dimensioned for sliding engagement with a slot 116. As will be appreciated, this preserves the operative association between the retainer 108 and the washboard track system 104.

The retainer 108 also includes a latch 128 for releasably engaging the vertically stacked steps 120. As will be appreciated, this could be accomplished by providing a retainer body having tabs 126 dimensioned whereby the retainer 108 could simply be pivoted sufficiently to disengage the latch 128 from the vertically stacked steps 120. In the depicted embodiment, an actuable latch 128 is provided, which by use of an actuator 130 retracts sufficiently into the retainer body 122 to disengage from the vertically stacked steps 120. Such structures are known in the art, for example as used in push-button latches, and do not require extensive description herein.

Figure 5:
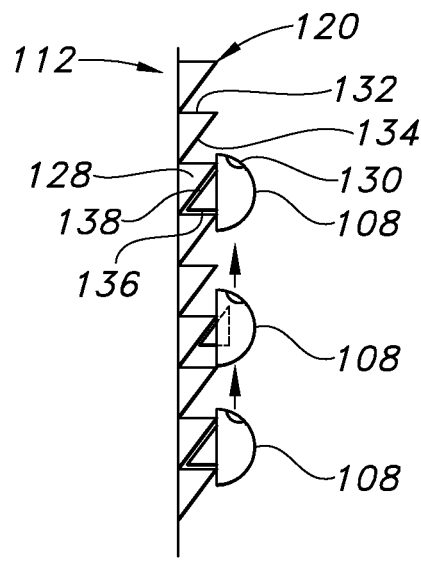
FIG. 5 depicts the retainer of FIG. 4 operatively associated with the track of FIG. 3.

This is illustrated in FIG. 5, showing side view of an embodiment of cooperating tracks 112 operatively associated with retainers 108. As shown, tracks 112 include vertically stacked steps 120 each defining a substantially horizontal top surface 132 and an inclined bottom surface 134. In turn, latch 128 defines a substantially horizontal bottom surface 136 and an inclined top surface 138. Thus, as shown the substantially horizontal surfaces of the latch 128 and of a stacked step 120 contact one another, keeping the retainer 108 at a desired height. By actuating actuator 130, latch 128 is sufficiently retracted to allow a user to raise and/or lower retainer 108 and the associated holder bar to a desired height. Of course, during the raising or lowering the retainer 108 does not disengage from the tracks 112 because of the sliding engagement of the tabs 126 and the slots 116.

Figure 6:
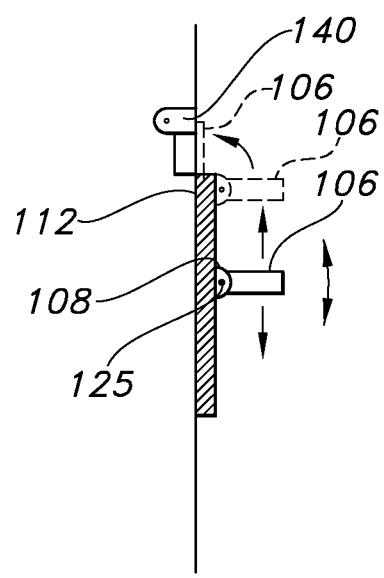
FIG. 6 illustrates raising, lowering, and stowing a holder bar according to the present disclosure.

With reference to FIGS. 4 and 6, the holder bar 106 may be configured to pivot about the retainer body 122 around an axis 125. This allows translating the holder bar between a deployed configuration as shown in FIG. 2 and a stowed configuration. In embodiments, the holder assembly 100 may include a recess 140 configured to receive the holder bar 106 in the stowed configuration. As will be appreciated, this allows the holder bar 106 to be stowed, whereby it does not occupy space in the cargo area C when not in use. That is, as shown in FIG. 6, the holder bar 106 may be raised or lowered to a desired height as described above, to hold a bag B, and when not in use may be raised and pivoted to a stowed configuration within the recess 140.

As will be appreciated, numerous benefits and advantages accrue from the above-described holder. By the article holder assembly 100, a height of the holder bar 106 can be incrementally vertically adjusted to hold articles such as handled bags B at a desired height above a load floor F of a vehicle. This allows the bags to be held in an upright orientation, preventing overturning and content spillage. In turn, as shown in FIG. 2 that desired height can be adjusted whereby a bottom of the handled bags B contacts the load floor F to provide a static base for the bags. This reduces the tendency of the bags to swing, and also reduces the likelihood of bag rupture caused by the contents weight.

Obvious modifications and variations are possible in light of the above teachings. For example, rather than the described pair of vertically-oriented tracks 112, the washboard track system 104 could comprise a single vertically oriented track 112 and a single retainer 108 substantially as shown in FIG. 3. As will be appreciated, in this embodiment the retainer would be dimensioned whereby the associated holder bar 106 could accommodate a desired number of held articles. All such modifications and variations are within the scope of the appended claims when interpreted in accordance with the breadth to which they are fairly, legally and equitably entitled.

What is claimed:

1. A holder assembly, comprising a vertically translatable article holder operatively associated with at least one substantially vertical washboard track;
   wherein the article holder comprises at least one retainer for releasably engaging a plurality of vertically stacked steps of the at least one washboard track and the at least one retainer further includes at least one tab for slidingly engaging at least one cooperating slot associated with the washboard track.

2. The assembly of claim 1, wherein the at least one retainer comprises at least one actuable latch for releasably engaging the plurality of vertically stacked steps.

3. The assembly of claim 1, wherein the article holder further comprises a holder bar including a pivoting gate.

4. The assembly of claim 3, wherein the holder bar pivots between a stowed configuration and a deployed configuration.

5. The assembly of claim 4, further including a recess for holding the holder bar in the stowed configuration.

6. A motor vehicle including the assembly of claim 1.

7. A holder assembly, comprising:
   at least one track comprising a plurality of vertically stacked steps; and
   a vertically translatable article holder comprising a holder bar and at least one retainer for releasably engaging the plurality of vertically stacked steps, wherein the at least one retainer comprises at least one tab for slidingly engaging at least one cooperating slot associated with the at least one track.

8. The assembly of claim 7, wherein the at least one retainer comprises at least one actuable latch for releasably engaging the plurality of vertically stacked steps.

9. The assembly of claim 7, wherein the holder bar includes a pivoting gate.

10. The assembly of claim 7, wherein the holder bar pivots between a stowed configuration and a deployed configuration.

11. The assembly of claim 10, further including a recess for holding the holder bar in the stowed configuration.

12. A motor vehicle including the assembly of claim 7.

13. A holder assembly, comprising:
a pair of spaced-apart substantially vertical parallel tracks each comprising a plurality of vertically stacked steps and at least one vertical slot; and
a vertically translatable holder comprising at least one retainer for releasably engaging the plurality of vertically stacked steps and a holder bar including a pivoting gate;
the at least one retainer including at least one cooperating tab for slidingly engaging the at least one vertical slot.

14. The assembly of claim 13, wherein the at least one retainer comprises at least one actuable latch for releasably engaging the plurality of vertically stacked steps.

15. The assembly of claim 13, wherein the holder bar pivots between a stowed configuration and a deployed configuration.

16. The assembly of claim 15, further including a recess for holding the holder bar in the stowed configuration.

17. A motor vehicle including the assembly of claim 13.

* * * * *